(12) United States Patent
Yu et al.

(10) Patent No.: US 9,744,647 B2
(45) Date of Patent: Aug. 29, 2017

(54) THIN WHEEL REINFORCED BY DISCONTINUOUS FIBERS

(71) Applicants: Saint-Gobain Abrasives, Inc., Worcester, MA (US); Saint-Gobain Abrasifs, Conflans-Sainte-Honorine (FR)

(72) Inventors: Xiangbin Yu, Shanghai (CN); Dan Zheng, Shanghai (CN); Gang Wang, Shanghai (CN); Dashi Nie, Shanghai (CN)

(73) Assignees: SAINT-GOBAIN ABRASIVES, INC., Worcester, MA (US); SAINT-GOBAIN ABRASIFS, Conflans-Sainte-Honorine (FR)

( * ) Notice: Subject to any disclaimer, the term of this patent is extended or adjusted under 35 U.S.C. 154(b) by 144 days.

(21) Appl. No.: 14/317,163

(22) Filed: Jun. 27, 2014

(65) Prior Publication Data

US 2015/0000205 A1 Jan. 1, 2015

Related U.S. Application Data

(60) Provisional application No. 61/846,320, filed on Jul. 15, 2013.

(30) Foreign Application Priority Data

Jun. 28, 2013 (CN) .......................... 2013 1 0270129

(51) Int. Cl.
*B24D 3/34* (2006.01)
*B32B 5/00* (2006.01)
(Continued)

(52) U.S. Cl.
CPC ................. *B24D 3/34* (2013.01); *B24D 3/28* (2013.01); *B24D 5/04* (2013.01); *B24D 5/14* (2013.01); *B32B 5/00* (2013.01); *B32B 5/022* (2013.01)

(58) Field of Classification Search
CPC .. B32B 5/16; B24D 3/28; B24D 18/00; C09K 3/14; C09K 3/1409; C09K 3/1436; C09K 3/1463
See application file for complete search history.

(56) References Cited

U.S. PATENT DOCUMENTS 3,030,743 A * 4/1962 Raymond ................ B24D 7/04
451/544
3,838,543 A 10/1974 Lakhani
(Continued)

FOREIGN PATENT DOCUMENTS

CN 1114670 A 1/1996
CN 101817171 A 9/2010
(Continued)

OTHER PUBLICATIONS

"405B Chopped Strand for Thermoset Reinforcement" Product Information Sheet. Owens Corning (2009).*
(Continued)

*Primary Examiner* — Matthew E Hoban
*Assistant Examiner* — Alexandra M Moore
(74) *Attorney, Agent, or Firm* — Abel Law Group, LLP; Thomas Osborn

(57) ABSTRACT

An abrasive article has an abrasive body with an axis and an axial thickness AT of not greater than about 10 mm. The abrasive body may include an abrasive matrix comprising an organic bond and abrasive particles, as well as a reinforcement of discontinuous fibers.

20 Claims, 8 Drawing Sheets

(51) Int. Cl.
*B24D 3/28* (2006.01)
*B24D 5/04* (2006.01)
*B24D 5/14* (2006.01)
*B32B 5/02* (2006.01)
*B24D 3/00* (2006.01)

(56) References Cited

U.S. PATENT DOCUMENTS

| | | |
|---|---|---|
| 4,918,116 A | 4/1990 | Gardziella et al. |
| 5,611,827 A | 3/1997 | Hammarstrom et al. |
| 5,861,203 A | 1/1999 | Yuan et al. |
| 6,299,508 B1 | 10/2001 | Gagliardi et al. |
| 6,419,981 B1 | 7/2002 | Novich et al. |
| 6,749,496 B2 | 6/2004 | Mota |
| 6,846,573 B2 | 1/2005 | Seydel |
| 6,942,561 B2 | 9/2005 | Mota |
| 2002/0184829 A1 | 12/2002 | Lemberger et al. |
| 2005/0025967 A1 | 2/2005 | Lawton et al. |
| 2008/0143010 A1 | 6/2008 | Kashikar et al. |
| 2010/0159806 A1 | 6/2010 | Wu et al. |
| 2010/0180512 A1 | 7/2010 | Arnaud et al. |
| 2012/0100784 A1 | 4/2012 | Klett et al. |
| 2012/0289125 A1 | 11/2012 | Billig et al. |
| 2012/0297693 A1 | 11/2012 | Zuyev et al. |
| 2013/0244542 A1* | 9/2013 | Meerveld ............ B24D 3/28 451/28 |

FOREIGN PATENT DOCUMENTS

| | | |
|---|---|---|
| CN | 202726754 U | 2/2013 |
| EP | 0577805 B1 | 3/1997 |
| EP | 0739264 B1 | 8/1998 |
| EP | 0997231 A2 | 5/2000 |
| EP | 0842013 B1 | 8/2000 |
| EP | 1259355 A1 | 11/2002 |
| EP | 0789641 B1 | 2/2005 |
| EP | 0874717 B1 | 8/2005 |
| EP | 1395395 B1 | 10/2005 |
| EP | 0988341 B1 | 5/2006 |
| EP | 1907476 A1 | 4/2008 |
| EP | 1968476 A1 | 9/2008 |
| EP | 2059368 A1 | 5/2009 |
| EP | 2237924 A1 | 10/2010 |
| EP | 1954445 A1 | 6/2015 |
| GB | 2028860 A | 3/1980 |
| JP | 2003-311630 A | 11/2003 |
| WO | 95-20469 A1 | 8/1995 |
| WO | 9855545 A1 | 12/1998 |
| WO | 2007005452 A1 | 1/2007 |
| WO | 2007079168 A1 | 7/2007 |
| WO | 2008034056 A1 | 3/2008 |
| WO | 2009079639 A1 | 6/2009 |
| WO | 2012092610 A1 | 7/2012 |

OTHER PUBLICATIONS

JG Williams (Fracture Mechanics of Polymers, Ellis Horwood Ltd, chapter 4 (1984)).

U.S. Appl. No. 14/317,340, filed Jun. 27, 2014, Inventors: Michael W. Klett, et al.

International Search Report for PCT/US2014/044515 dated Oct. 21, 2014, 8 pgs.

International Search Report for PCT/US2014/044539 dated Oct. 28, 2014, 4 pgs.

Victor C. Li and Hwai-Chung Wu, Conditions for pseudo strain-hardening in fiber reinforced brittle matrix composites, Applied mechanics review, vol.45, No. 8, pp. 390-398, 1991.

Victor C. Li etal, A micromechanical model of tension-softening and bridging toughening of short random fiber reinforced brittle matrix composites, Journal of the mechanics and physics in solids, vol. 39, No. 5, pp. 607-625,1991.

Victor C. Li, Postcrack scaling relations for fiber reinforced cementitious composites, Journal of materials in civil engineering, vol. 4, No. 1 pp. 41-57,1992.

Zhong Lin and Victor C. Li, Crack bridging in fiber reinforced cementitious composites with slip-hardening interfaces, Journal of the mechanics and physics in solids, vol. 45, No. 5, pp. 763-787,1997.

* cited by examiner

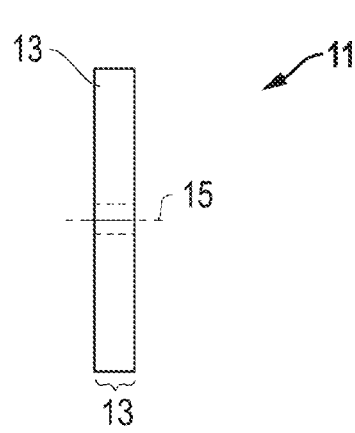
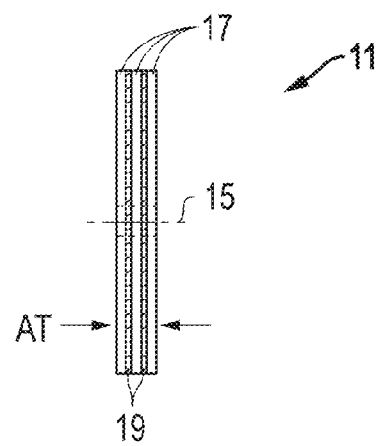
FIG. 4    FIG. 5
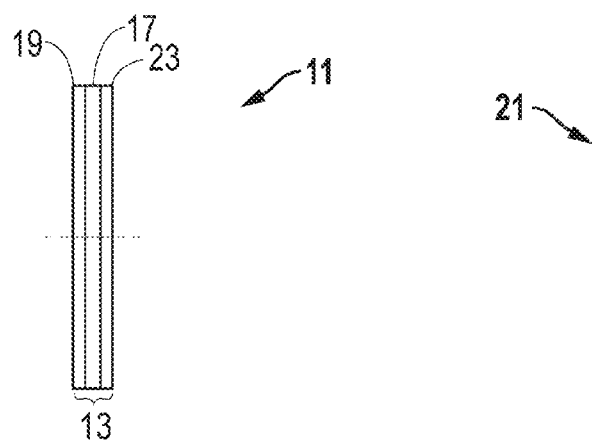
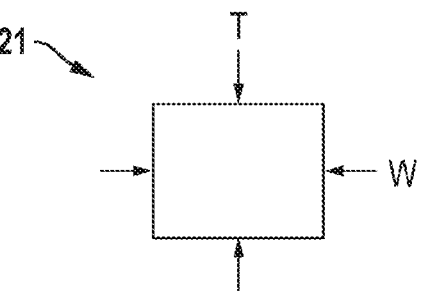
FIG. 6    FIG. 7A
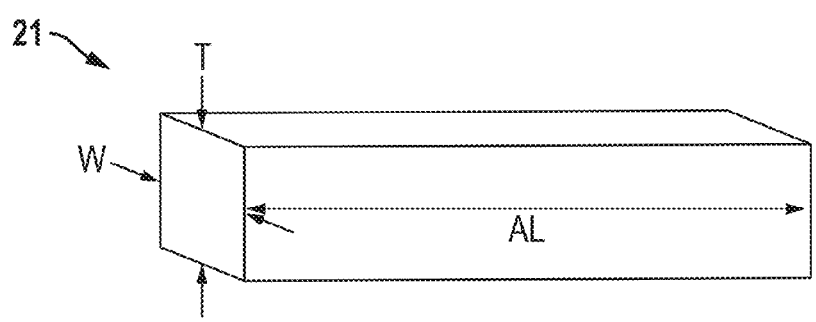
FIG. 7B

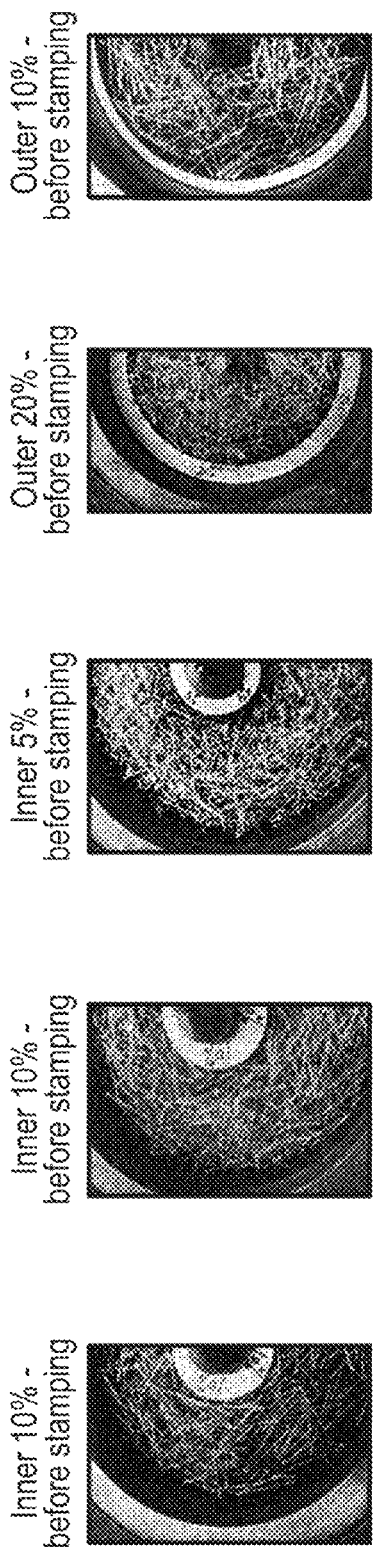
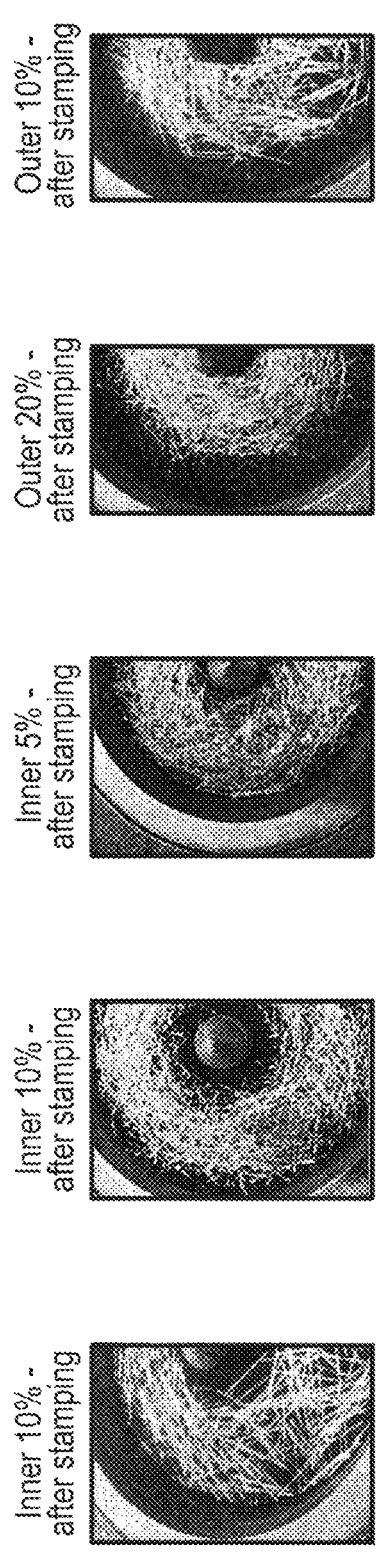
FIG. 16A  FIG. 16B
FIG. 16C  FIG. 16D
FIG. 16E  FIG. 16F
FIG. 16G  FIG. 16H
FIG. 16I  FIG. 16J

THIN WHEEL REINFORCED BY DISCONTINUOUS FIBERS This patent application claims priority to and the benefit of Chinese Invention Pat. App. No. 201310270129.X, filed Jun. 28, 2013, and U.S. Prov. Pat. App. No. 61/846,320, filed Jul. 15, 2013, each of which is incorporated herein by reference in its entirety.

BACKGROUND OF THE INVENTION

Field of the Disclosure

The present invention relates in general to abrasive wheels and, in particular, to a system, method and apparatus for a thin wheel that is reinforced by chopped fiber.

Description of the Related Art

The bursting speed and side load of thin cutting and grinding wheels are enhanced when sufficient continuous fiber reinforcements (fabric webs, in practice) are included. By sufficient continuous fiber reinforcement, the toughness of the thin wheel is greatly increased since microscopically, before the rupture of the fabric, multiple cracking in the matrix dissipates the energy. It is more difficult to toughen brittle materials with randomly distributed short fibers than with continuous fibers. In the case of randomly distributed chopped fibers bridging an existing crack, some portion of the fibers do not cross the crack flank and some portions of the fibers, due to small embedded length, pull out at small crack opening displacements. Therefore, the crack bridging force of the randomly distributed fiber is greatly reduced and is problematic. Thus, improvements in thin wheel construction continue to be of interest.

SUMMARY

Embodiments of a thin wheel reinforced by discontinuous fibers are disclosed. For example, an abrasive article may comprise an abrasive body having an axis, an outer diameter OD not greater than about 300 mm, and an axial thickness AT not greater than about 10 mm. The abrasive body may comprise an abrasive matrix having an organic bond and abrasive particles. The abrasive body may further include a reinforcement comprising discontinuous fibers.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

FIGS. 4-6 are edge views of alternate embodiments of abrasive articles.

FIGS. 7A and 7B are end and side views of embodiments of discontinuous fibers.

FIGS. 16A-16J include photographs of embodiments of wheels with masked portions not having chopped fiber reinforcements.

The use of the same reference symbols in different drawings indicates similar or identical items.

DETAILED DESCRIPTION

Embodiments of a system, method and apparatus for a thin wheel reinforced by discontinuous fibers are disclosed. For example, an abrasive article 11 may comprise an abrasive body 13 having an axis 15. In some versions, the abrasive body 13 may have an outer diameter (OD) and an axial thickness (AT).

For example, the OD may be not greater than about 300 mm. In other embodiments, the OD may be not greater than about 250 mm, such as not greater than about 200 mm, not greater than about 150 mm, or even not greater than about 100 mm. In other versions, the OD may be at least about 25 mm, such as at least about 50 mm, at least about 75 mm, or even at least about 100 mm. Alternatively, the OD may be in a range between any of these minimum and maximum values.

In other examples, the AT can be not greater than about 10 mm. In some embodiments, the AT may be not greater than about 8 mm, such as not greater than about 6 mm, not greater than about 4 mm, not greater than about 2 mm, not greater than about 1 mm, or even not greater than about 0.5 mm. In other versions, the AT may be at least about 0.1 mm, such as at least about 0.5 mm, at least about 1 mm, or even at least about 2 mm. Alternatively, the AT may be in a range between any of these minimum and maximum values.

Figure 3A:
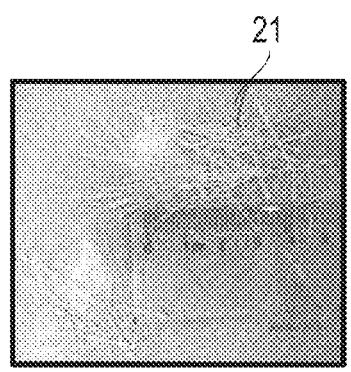
FIGS. 3A-3D are photographs of embodiments of discontinuous fibers, an abrasive layer, a discontinuous fiber layer, and an abrasive article, respectively.

Embodiments of the abrasive body 13 may comprise an abrasive matrix 17 comprising an organic bond and abrasive particles. The abrasive body may further comprise a reinforcement 19 comprising discontinuous fibers 21 (FIG. 3A). For example, the discontinuous fibers 21 may comprise chopped strand fibers (CSF). In another version, the discontinuous fibers 21 may comprise phenolic resin-coated fiberglass chopped strand fibers.

The discontinuous fibers 21 may be dispersed in the abrasive matrix 17 (FIG. 4). In one example, the discontinuous fibers 21 may be dispersed throughout the abrasive matrix 17, such that the discontinuous fibers 21 are substantially randomly distributed throughout the abrasive body 13 and do not form a separate layer.

Figure 1:
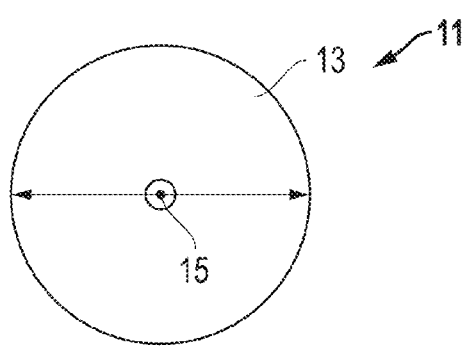
FIGS. 1 and 2 are schematic side and edge views of an embodiment of an abrasive article.
Figure 2:
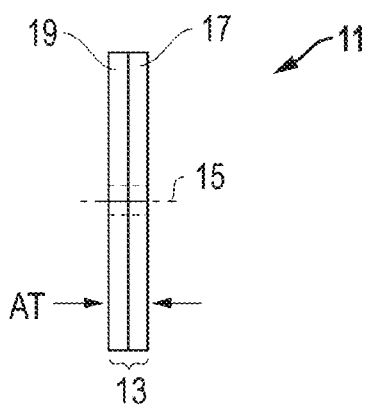

The discontinuous fibers 21 also may be formed as a discrete layer 19 (FIGS. 2 and 3C) in the abrasive matrix 17. The abrasive article 11 may comprise an abrasive portion 13 comprising an organic bond material and abrasive particles dispersed in the organic bond material. A discrete layer 19 of chopped strand fibers (CSF) may be located at least partially in the organic bond material and mounted to the abrasive portion 13 for reinforcement thereof.

Figure 3B:
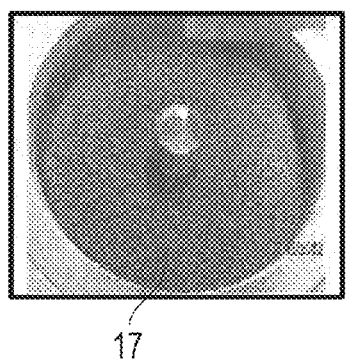

In other examples, the discrete layer 19 may comprise a plurality of discrete layers 19 (FIG. 5) that are axially separated from each other by portions or layers of the abrasive matrix 17 (FIG. 3B). The abrasive portion 17 may comprise at least two abrasive layers, such that the discrete layer 19 is located and extends radially between said at least two abrasive layers.

Figure 3C:
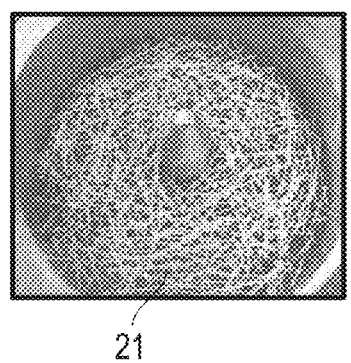
Figure 3D:
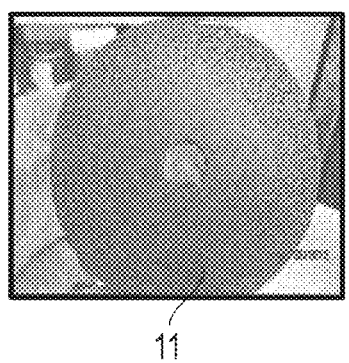

In some versions, the abrasive body 13 does not have a continuous fiber reinforcement web, such that the abrasive body 13 is reinforced only by the discontinuous fibers 21 (FIG. 3D). Other versions of the abrasive article 11 may further comprise at least one continuous fiber reinforcement web 23 (FIG. 6) in the abrasive body 13, such that the abrasive body 13 is reinforced by the discontinuous fibers 21 and the continuous fiber reinforcement web 23.

As shown in FIG. 7A, embodiments of the discontinuous fibers 21 may comprise a substantially rectangular sectional shape having a sectional aspect ratio of width W to thickness T in a range of about 1.25:1 to about 3:1. For example, the sectional aspect ratio may be about 1.75:1 to about 2.75:1, or even about 2:1 to about 2.5:1.

In some embodiments, the discontinuous fibers 21 may comprise a width W (e.g., a radial width) of at least about 0.1 mm. For example, the radial width may be at least about 0.2 mm, such as at least about 0.3 mm. In other versions, the radial width can be not greater than about 0.5 mm, such as not greater than about 0.4 mm, not greater than about 0.3 mm, or even not greater than about 0.2 mm. The width may be in a range between any of the minimum and maximum values.

As shown in FIG. 7B, embodiments of the discontinuous fibers 21 may comprise an axial length AL of at least about 6 mm. In other versions, the AL may be at least about 7 mm, such as at least about 8 mm, at least about 10 mm, at least about 15 mm, or even at least about 20 mm. Still other versions of the AL can be not greater than about 150 mm, such as not greater than about 100 mm, not greater than about 75 mm, not greater than about 50 mm, not greater than about 40 mm, or even not greater than about 30 mm. The AL may be in a range between any of these minimum and maximum values.

Embodiments of the discontinuous fibers 21 may have an aspect ratio of axial length AL to radial width W of at least about 12. For example, the aspect ratio may be at least about 25, such as at least about 50, at least about 75, at least about 100, at least about 250, or even at least about 500. In other versions, the aspect ratio can be not greater than about 1500, such as not greater than about 1000, not greater than about 750, not greater than about 500, not greater than about 250, not greater than about 200, or even not greater than about 150. The aspect ratio may be in a range between any of these minimum and maximum values.

In some embodiments, the discontinuous fibers 21 can have a single fiber bundle pull out shear strength at an interface between the abrasive matrix 13 and the discontinuous fibers 21 of at least about 5 Mpa. For example, the single fiber pull out shear strength can be at least about 10 Mpa, such as at least about 15 Mpa. The single fiber pull out shear strength may be in a range between any of these minimum and maximum values.

Embodiments of the abrasive article 11 may have discontinuous fibers 21 with a single fiber bundle pull out rupture stress at an interface between the abrasive matrix and the discontinuous fibers of at least about 40 N. For example, the single fiber bundle pull out rupture stress at the interface between the abrasive matrix and the discontinuous fibers can be at least about 50 N, such as at least about 60 N. The single fiber bundle pull out rupture stress at the interface between the abrasive matrix and the discontinuous fibers may be in a range between any of these minimum and maximum values.

Other embodiments of the abrasive article 11 may have discontinuous fibers with a critical embedded length Lc of at least about 2 mm. For example, the critical embedded length Lc can be at least about 3 mm, such as at least about 4 mm. The critical embedded length can be in a range between any of these values.

Embodiments of the abrasive body 13 may comprise a volume percentage of the discontinuous fibers 21 of at least about 1 vol %. For example, the volume percentage of the discontinuous fibers can be at least about 2 vol %, such as at least about 3 vol %, at least about 4 vol %, at least about 5 vol %, at least about 6 vol %, or even at least about 9 vol %. In other versions, the volume percentage of the discontinuous fibers can be not greater than about 25 vol %, such as not greater than about 20 vol %, not greater than about 15 vol %, or even not greater than about 12 vol %. The volume percentage of the discontinuous fibers can be in a range between any of these minimum and maximum values.

In other examples, the abrasive article can comprise at least about 25 vol % of the organic bond material. In other examples, the abrasive article can comprise at least about 30 vol %, such as at least about 35 vol %, at least about 40 vol %, or even at least about 45 vol %. In still other versions, the abrasive article can include not greater than about 70 vol % of the abrasive particles, such as not greater than about 65 vol %, not greater than about 60 vol %, not greater than about 55 vol %, or even not greater than about 50 vol %. The abrasive particle content can be in a range between any of these values.

Embodiments of the abrasive article 11 can have a burst speed in excess of a burst speed of a conventional abrasive article having at least one continuous fiber reinforcement. For example, the burst speed of the abrasive article 11 can be at least about 1% greater than that of the conventional abrasive article, such as at least about 5% greater, or even at least about 10% greater than that of the conventional abrasive article.

In still other embodiments, the abrasive article may include discontinuous fibers that are oriented in a configuration comprising at least one of axial, parallel, circumferential and randomly distributed. In some versions, the discontinuous fibers are oriented in a configuration comprising a circumferential distribution, and the abrasive article has a burst speed of up to about 30% greater than that for a conventional abrasive article having a continuous fiber reinforcement web.

Embodiments of the abrasive article may include discontinuous fibers formed in a discrete layer in the abrasive body, except for not greater than about 5% of the abrasive body. Versions may include discontinuous fibers, except for not greater than about 10% of the abrasive body, such as except for not greater than about 15%, except for not greater than about 20%, or even except for not greater than about 25%. The discontinuous fiber content may be in a range between any of these values.

Other embodiments of the abrasive article can have discontinuous fibers that are not located in the discrete layer at at least one of an innermost diameter and an outermost diameter of the abrasive body.

In other embodiments, a method of forming an abrasive article may comprise providing an abrasive portion with an organic bond material and abrasive particles dispersed in the organic bond material; forming a discrete layer of discontinuous fibers; and then pressing the abrasive article with the abrasive portion and the discrete layer as a reinforcement for the abrasive article.

The method may comprise forming the discrete layer on top of or in the abrasive portion. Alternatively, the method may comprise forming the discrete layer as a plurality of discrete layers, and axially separating the discrete layers from each other by portions of the abrasive portion. In other versions, the method may comprise forming the abrasive article without a continuous fiber reinforcement web, such that the abrasive article is reinforced only by the discrete layer of discontinuous fibers.

Examples

Some abrasive articles are required to conform to abrasive safety European Norm EN1214. For example, reinforced wheels of handheld machines can be required to pass a burst speed test. A wheel with a 100 mm diameter may be required to pass at least 26,500 rpm burst speed. A wheel with a 115 mm diameter may be required to pass a 21,200 rpm burst speed. For this test, a wheel without a web reinforcement and a standard wheel reinforced by conventional continuous fiber webs (i.e., 85 g-14 mesh, 2 pieces of fabric) samples were tested for comparison.

The phenolic resin coated glass fiber bundle had a 0.34 mm×0.15 mm rectangular cross section shape. Chopped fibers of 20 mm length (FIG. 3A) were selected to reinforce the abrasive matrix. The volume fraction of the chopped fibers was selected at 6.0%, 9.0%, 10.5% and 12.0%. After spreading about 50% volume of the abrasive matrix as the base layer (FIG. 3B), chopped fibers were added randomly on the surface (FIG. 3C). Then, the structure was baked and pressed for a few seconds to make sure the fiber was flat and the random pattern was not altered by the processing steps. Finally, the remaining 50% of abrasive matrix was spread on the top and 178 bar pressure is applied and held for a few seconds to form the abrasive article (FIG. 3D). See Table 1.

TABLE 1

Samples specification and manufacturing parameters

| Type | UTW | UTW |
|---|---|---|
| Dimension* | OD: 100 mm; ID: 16 mm; Thickness 1.6 mm~2 mm | OD: 125 mm; ID: 22 mm; Thickness 1.6 mm~2 mm |
| Abrasive matrix weight | 30 g | 46.9 g |
| Chopped fiber weight | 0 g; 1.2 g; 1.8 g; 2.0 g; 2.4 g | 3.0 g |
| Product structure | AVA | AVA |
| Pressure | 178 bar | 178 bar |
| Curing cycle | 23 hrs with 200° C. soaking | 23 hrs with 200° C. soaking |

Figure 8:
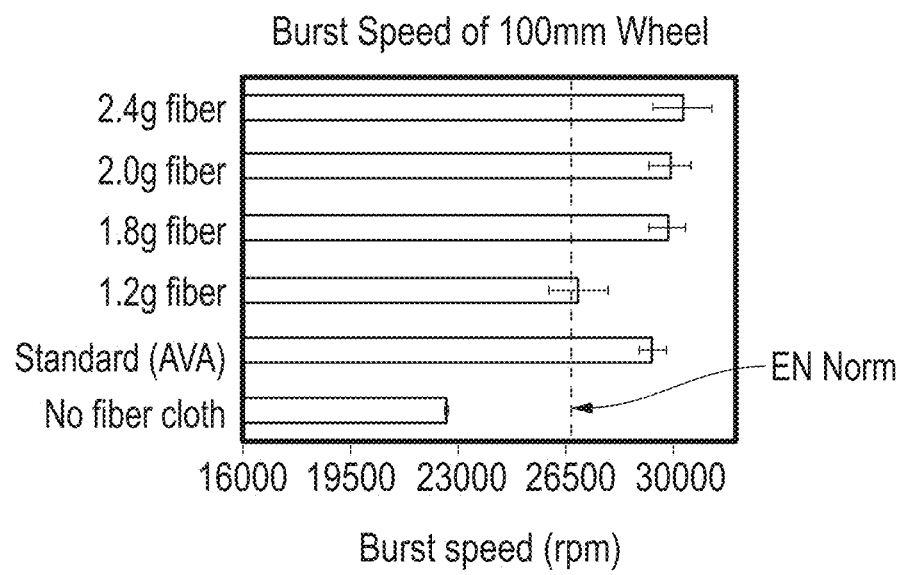
FIGS. 8 and 9 are plots of burst speed testing.
Figure 9:
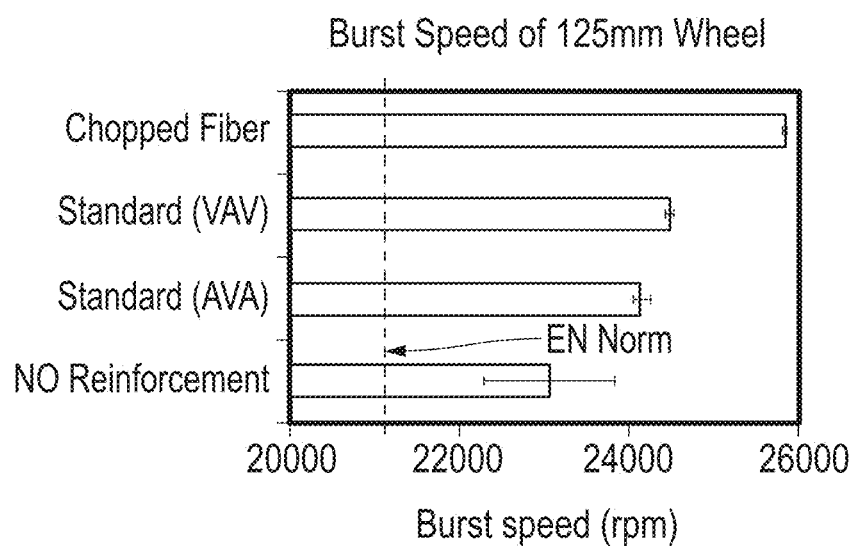

The test results are summarized in FIGS. 8 and 9. The bursting speeds of wheels with chopped fiber weights of 1.8 g, 2.0 g, and 2.4 g exceed the EN norm, and even exceed the performance of the standard thin wheel. Moreover, the bursting speed of a wheel with 2.65 g chopped fiber is greater than the standard, continuous fiber reinforcement AVA and VAV structure wheels. Thus, an abrasive article in accordance with embodiments described herein can have a burst speed in excess of a burst speed of a conventional abrasive article having at least one continuous fiber reinforcement. The burst speed of the abrasive article 11 can be at least about 1% to about 10% greater than that of the conventional abrasive article.

Figure 10:
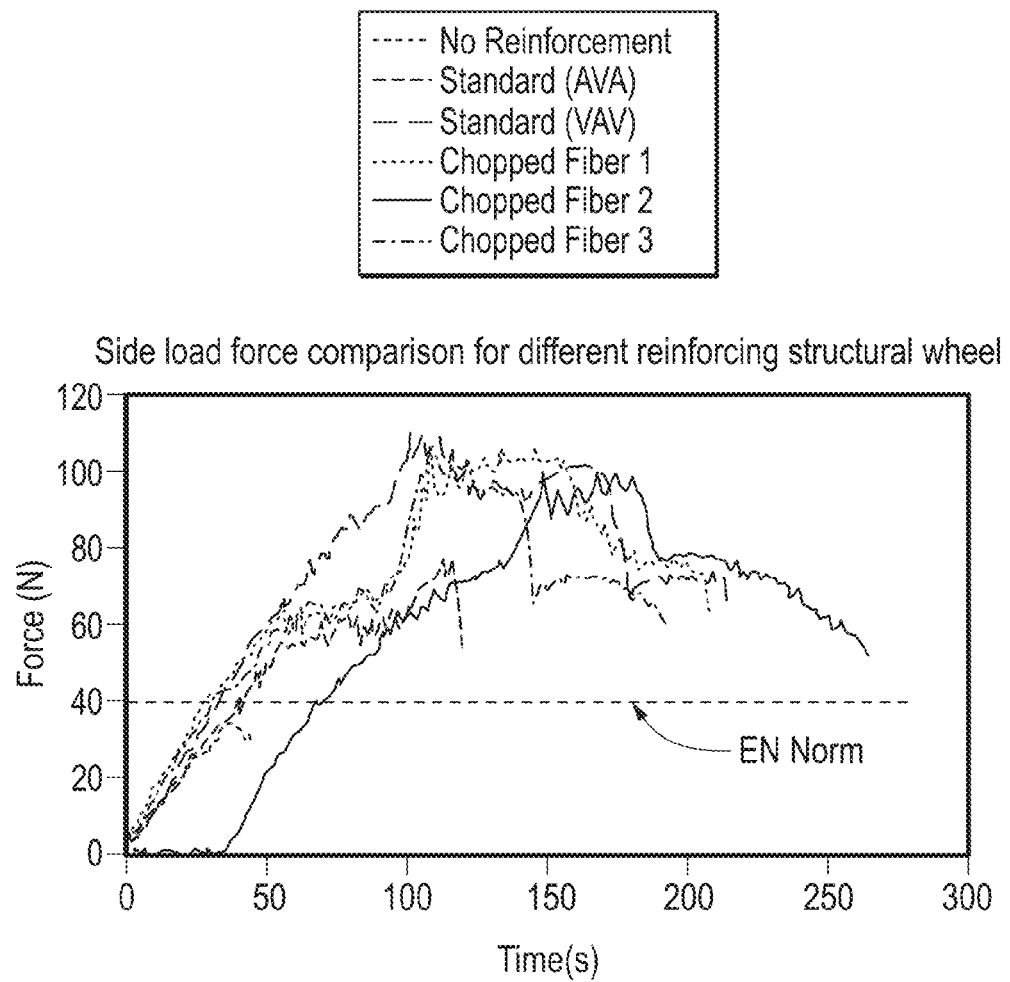
FIG. 10 is a plot of side load testing.

According to the EN norm, thin wheels with an OD between 115 mm and 25 mm are also required to pass a 40 N side load force to ensure the mechanical integrity of the structure when subjected to out-of-plane force during operation. FIG. 10 demonstrates that all reinforced wheels in accordance with embodiments described herein pass the EN norm for side load. The maximum side load force for chopped fiber wheels was about 2.5 times the norm.

Figure 11:
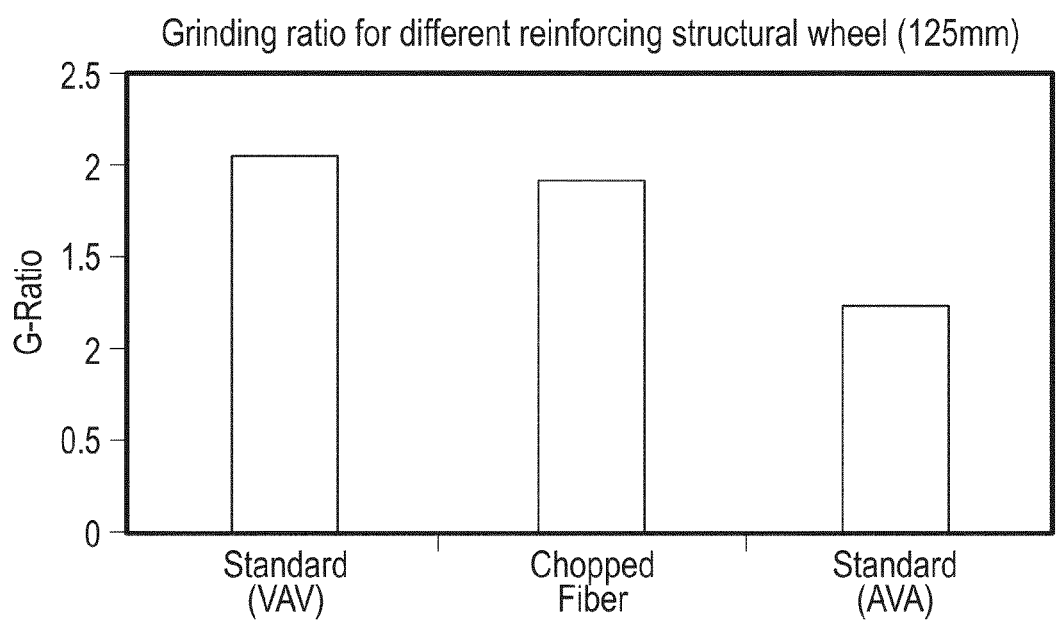
FIG. 11 is a graph of performance testing.

As shown in FIG. 11, standard (VAV & AVA) and chopped strand fiber reinforced 125 mm OD thin wheels were tested for their cutting performance. The chopped fiber based wheels have a similar cutting performance as standard products. In other tests, these samples passed the EN burst speed norm of 21,200 rpm with performances of 21,500 rpm±100, such as 21,700 rpm. These samples also passed the side load force test minimum of 290 N with performances of 660 N, 628 N and 638 N.

Figure 12:
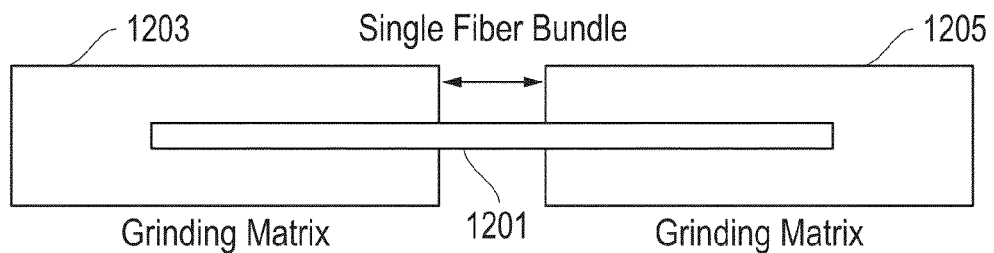
FIG. 12 is a schematic drawing of a single fiber pull out test.
Figure 13A:
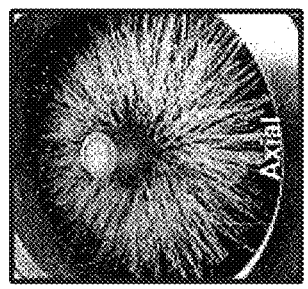
FIGS. 13A-13E are photographs of alternate embodiments of abrasive articles.
Figure 13B:
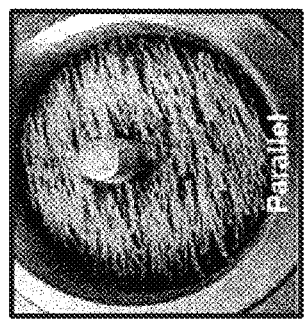
Figure 13C:
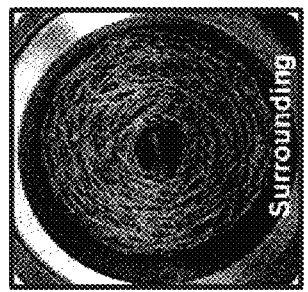
Figure 13D:
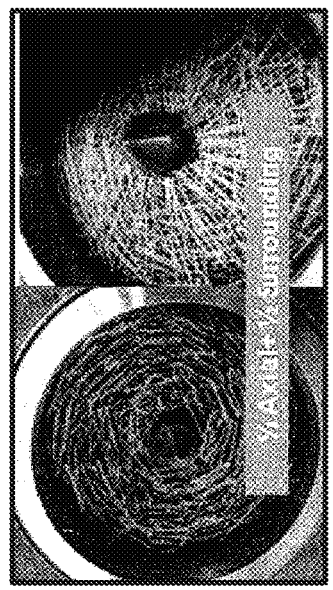
Figure 13E:
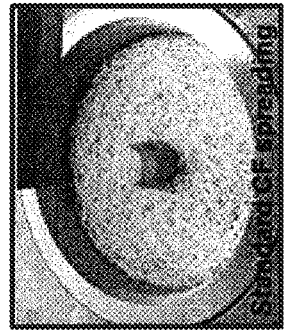

The abrasive article also was tested for single fiber bundle pull out shear strength at an interface between the abrasive matrix and the discontinuous fibers. In one experiment, the single fiber pull out shear strength was 18 Mpa. To obtain the interface properties between the fiber and the matrix, single fiber bundle pull out testing was employed. As shown in FIG. 12, the test comprised embedding the axial ends of a fiber bundle 1201 (having a length of 50 mm, and a rectangular cross section of 1.2 mm×0.34 mm) into two abutting grinding matrices 1203, 1205 (shown spaced apart in FIG. 12). The dimensions of each matrix 1203, 1205 were 20.0 mm width×3.0 mm thickness×120 mm length. The fiber bundle 1201 was located near the centroid of the abutting matrices 1203, 1205. After curing, tensile testing by an Instron machine was conducted on the sample. The two abutting matrices 1203, 1205 were gripped by the machine and then separated axially. The grinding matrices 1203, 1205 were axially separated by about 2 mm (as shown in FIG. 12), such that about 2 mm length of the fiber bundle 1201 is exposed between the axially separated grinding matrices 1203, 1205. Since the single fiber bundle 1201 is more deformable than the grinding matrices 1203, 1205, the displacement is primarily accommodated by the 2 mm unwrapped fibers and the fiber/matrix interface debonding. By analysis of the displacement and load curve, the fiber/matrix interface properties can be extracted. Typically, the interface strength for such thin wheel products is on the order of 20 MPa.

The abrasive article was further tested for single fiber bundle pull out rupture stress at an interface between the abrasive matrix and the discontinuous fibers. In one experiment, the single fiber pull out test and rupture test of fabrics at the interface between the abrasive matrix and the discontinuous fibers was 60 N. The rupture load of a single fiber bundle can be tested by elongating the fiber fabric with an Instron machine.

The abrasive article also was tested for critical embedded length Lc of the CSF. The critical embedded length Lc was found to be 4 mm in one experiment. The Lc was obtained from the single fiber pull out test data. Since we assume that the interface strength for thin wheel is approximately 20 Mpa, the critical embedded length Lc can be calculated by mechanics of material. In the case of a 60 N rupture load and 0.34 mm×0.15 mm cross section fiber bundle, Lc is found to be 4 mm.

In another experiment (see FIGS. 13-15), different configurations of abrasive articles were constructed and tested.

As shown in FIGS. 13A-13E, these included abrasive wheels constructed with chopped fibers arrayed in various orientations, such as in axial, parallel, surrounding (e.g., substantially circumferential orientation of the chopped fibers), combined half-axial and half-surrounding (i.e. in the same chopped fiber layer), and randomly distributed (e.g., like FIG. 3C) patterns, respectively. These wheels were otherwise constructed as previously described above, in an AVA layered pattern.

Figure 14:
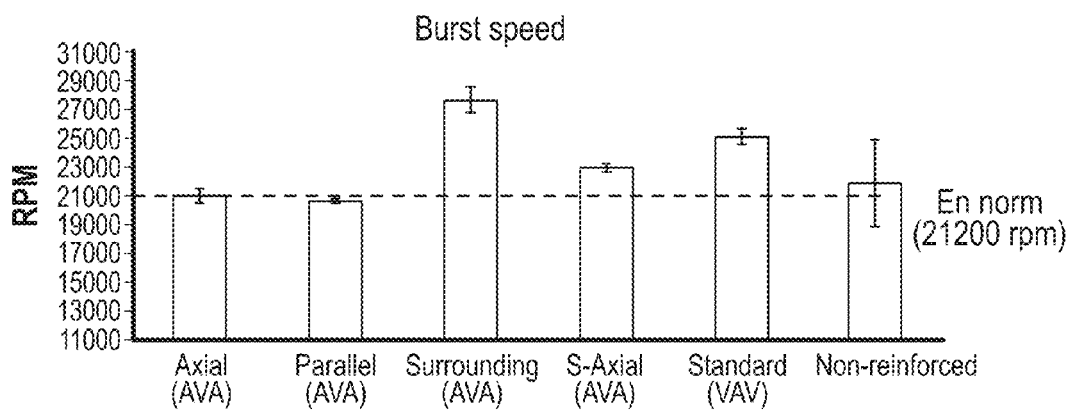
FIGS. 14 and 15 are plots of burst speed and loading force, respectively, for several of the embodiments of FIG. 13.
Figure 15:
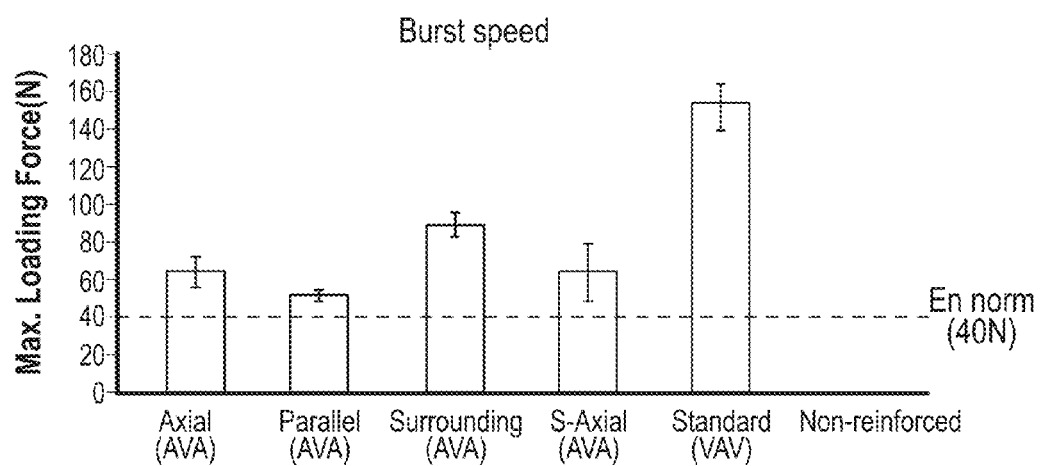

The performance of these wheels is depicted in FIGS. 14 and 15. Fiber orientation more significantly affected burst speed (FIG. 14) than side loading force (FIG. 15). The surrounding orientation of the chopped fibers (FIG. 13C) provided up to about a 30% improvement in burst speed compared to conventional reinforcement web products, and acceptable side load force performance.

In still another experiment (FIG. 16), the location of the placement of chopped fiber was varied in sample wheels having an AVA construction. For example, FIGS. 16A and B depict a layer of chopped fibers wherein the chopped fibers cover the entire surface on which they are placed, except for 10% of the innermost diameter of that surface. In particular, FIG. 16A shows a mask positioned at the innermost diameter, and labeled "10%" to prevent chopped fiber from being placed there (prior to stamping). FIG. 16B shows the same wheel, after stamping, and with the mask removed. FIGS. 16C and 16D show photos of an almost identical wheel, but with a higher density of chopped fiber (except at 10% of the innermost diameter). FIGS. 16E and 16F show a similar wheel, but masked at only 5% of the innermost diameter. FIGS. 16G and 16H mask 20% of the outer diameter of a wheel. Finally, FIGS. 16I and 16J mask only 10% of the outer diameter of a wheel.

The impact of these various locations and amounts of chopper fiber surface coverage include the following data. Bursting speed results:

| | |
|---|---|
| Inner 10% | 21483 ± 566.5 |
| Inner 5% | 23188 ± 242 |
| Outer 10% | 24575.7 ± 833.1 |
| Outer 20% | 26370 ± 105 |
| Norm | 21200 rpm |

Side Load Force:

| | |
|---|---|
| Inner 10% | 80N |
| Inner 5% | 80N |
| Outer 10% | 111N |
| Outer 20% | 90N |
| Norm | 40N |

The lack of chopped fiber reinforcement at the inner diameters of the wheel appears to have an impact on breakage, since (after testing) most cracks began from the center of the wheels. A lack of chopped at the outer diameters of the wheels appears to have less impact on breakage. However, all samples passed the tests. Additional samples were prepared and tested with masks comprising 25% or more of the surface area (i.e., without chopped fibers). Some of these samples did not pass the tests.

Still other embodiments may include one or more of the following items:

Item 1. An abrasive article, characterized in that the abrasive article comprises:

an abrasive body having an axis and an axial thickness AT not greater than about 10 mm; the abrasive body comprising:

an abrasive matrix comprising an organic bond and abrasive particles; and a reinforcement comprising discontinuous fibers.

Item 2. The abrasive article of one or more of these items, characterized in that the discontinuous fibers are chopped strand fibers (CSF).

Item 3. The abrasive article of one or more of these items, characterized in that the discontinuous fibers are dispersed in the abrasive matrix.

Item 4. The abrasive article of one or more of these items, characterized in that the discontinuous fibers are formed as a discrete layer in the abrasive matrix.

Item 5. The abrasive article of one or more of these items, characterized in that the discrete layer comprises a plurality of discrete layers that are axially separated from each other by portions of the abrasive matrix.

Item 6. The abrasive article of one or more of these items, characterized in that the abrasive article does not have a continuous fiber reinforcement web, such that the abrasive article is reinforced only by the discontinuous fibers.

Item 7. The abrasive article of one or more of these items, characterized by at least one continuous fiber reinforcement web in the abrasive article, such that the abrasive article is reinforced by the discontinuous fibers and the continuous fiber reinforcement web.

Item 8. The abrasive article of one or more of these items, characterized in that the discontinuous fibers are dispersed throughout the abrasive matrix, such that the discontinuous fibers are substantially randomly distributed throughout the abrasive body.

Item 9. The abrasive article of one or more of these items, characterized in that the abrasive body has an outer diameter OD not greater than about 300 mm, not greater than about 250 mm, not greater than about 200 mm, not greater than about 150 mm, or not greater than about 100 mm.

Item 10. The abrasive article of one or more of these items, characterized in that the AT is not greater than about 8 mm, not greater than about 6 mm, not greater than about 4 mm, not greater than about 2 mm, not greater than about 1 mm, not greater than about 0.5 mm.

Item 11. The abrasive article of one or more of these items, characterized in that the discontinuous fibers comprise phenolic resin-coated fiberglass chopped strand fibers.

Item 12. The abrasive article of one or more of these items, characterized in that the discontinuous fibers comprise a substantially rectangular sectional shape having a sectional aspect ratio of width to thickness in a range of about 1.25:1 to about 3:1, about 1.75:1 to about 2.75:1, or about 2:1 to about 2.5:1.

Item 13. The abrasive article of one or more of these items, characterized in that the discontinuous fibers comprise an axial length of at least about 6 mm, at least about 7 mm, at least about 8 mm, at least about 10 mm, at least about 15 mm, at least about 20 mm, and not greater than about 150 mm, not greater than about 100 mm, not greater than about 75 mm, not greater than about 50 mm, not greater than about 40 mm, or not greater than about 30 mm.

Item 14. The abrasive article of one or more of these items, characterized in that the discontinuous fibers comprise a radial width of at least about 0.1 mm, at least about 0.2 mm, at least about 0.3 mm, and not greater than about 0.5 mm, not greater than about 0.4 mm, not greater than about 0.3 mm, or not greater than about 0.2 mm.

Item 15. The abrasive article of one or more of these items, characterized in that the discontinuous fibers have a single fiber bundle pull out shear strength at an interface between the abrasive matrix and the discontinuous fibers of at least about 5 Mpa, at least about 10 Mpa, at least about 15 Mpa.

Item 16. The abrasive article of one or more of these items, characterized in that the discontinuous fibers have a single fiber bundle pull out rupture stress at an interface between the abrasive matrix and the discontinuous fibers of at least about 40 N, at least about 50 N, at least about 60 N.

Item 17. The abrasive article of one or more of these items, characterized in that the discontinuous fibers have a critical embedded length Lc of at least about 2 mm, at least about 3 mm, at least about 4 mm.

Item 18. The abrasive article of one or more of these items, characterized in that the abrasive body comprises a volume percentage of the discontinuous fibers of at least about 1 vol %, at least about 2 vol %, at least about 3 vol %, at least about 4 vol %, at least about 5 vol %, at least about 6 vol %, at least about 9 vol %, and not greater than about 25 vol %, not greater than about 20 vol %, not greater than about 15 vol %.

Item 19. The abrasive article of one or more of these items, characterized in that the abrasive article about 25 vol % to about 50 vol % of the organic bond material; about 40 vol % to about 70 vol % of the abrasive particles; and about 6 vol % to about 12 vol % of the discontinuous fibers.

Item 20. The abrasive article of one or more of these items, characterized in that the abrasive article has a burst speed in excess of a burst speed of a conventional abrasive article having at least one continuous fiber reinforcement, and wherein the burst speed of the abrasive article is at least about 1% greater than that of the conventional abrasive article, at least about 5% greater, or at least about 10% greater.

Item 21. The abrasive article of one or more of these items, characterized in that the discontinuous fibers have an aspect ratio of axial length to radial width of at least about 12, at least about 25, at least about 50, at least about 75, at least about 100, at least about 250, at least about 500, and not greater than about 1500, not greater than about 1000, not greater than about 750, not greater than about 500, not greater than about 250, not greater than about 200, not greater than about 150.

Item 22. An abrasive article, characterized in that the abrasive article comprises:
an abrasive portion comprising an organic bond material and abrasive particles dispersed in the organic bond material; and
a discrete layer of chopped strand fibers (CSF) in the organic bond material mounted to the abrasive portion for reinforcement thereof.

Item 23. The abrasive article of one or more of these items, characterized in that the abrasive portion comprises at least two abrasive layers, such that the discrete layer is located and extends radially between said at least two abrasive layers.

Item 24. The abrasive article of one or more of these items, characterized in that the abrasive portion has an outer diameter OD not greater than about 300 mm, and an axial thickness AT not greater than about 10 mm.

Item 25. The abrasive article of one or more of these items, characterized in that the OD is not greater than about 200 mm, not greater than about 150 mm, or not greater than about 100 mm.

Item 26. The abrasive article of one or more of these items, characterized in that the AT is not greater than about 8 mm, not greater than about 6 mm, not greater than about 4 mm, not greater than about 2 mm, not greater than about 1 mm, not greater than about 0.5 mm.

Item 27. The abrasive article of one or more of these items, characterized in that the discrete layer comprises a plurality of discrete layers that are axially separated from each other by portions of the abrasive portion.

Item 28. The abrasive article of one or more of these items, characterized in that the abrasive article does not have a continuous fiber reinforcement web, such that the abrasive body is reinforced only by the CSF.

Item 29. The abrasive article of one or more of these items, characterized by at least one continuous fiber reinforcement web in the abrasive body, such that the abrasive article is reinforced by the CSF and the continuous fiber reinforcement web.

Item 30. The abrasive article of one or more of these items, characterized in that the CSF comprise phenolic resin-coated fiberglass CSF.

Item 31. The abrasive article of one or more of these items, characterized in that the CSF comprise a substantially rectangular sectional shape having a sectional aspect ratio of width to thickness in a range of about 1.25:1 to about 3:1, about 1.75:1 to about 2.75:1, or about 2:1 to about 2.5:1.

Item 32. The abrasive article of one or more of these items, characterized in that the CSF comprise an axial length of at least about 6 mm, at least about 7 mm, at least about 8 mm, at least about 10 mm, at least about 15 mm, at least about 20 mm, and not greater than about 150 mm, not greater than about 100 mm, not greater than about 75 mm, not greater than about 50 mm, not greater than about 40 mm, or not greater than about 30 mm.

Item 33. The abrasive article of one or more of these items, characterized in that the CSF comprise a radial width of at least about 0.1 mm, at least about 0.2 mm, at least about 0.3 mm, and not greater than about 0.5 mm, not greater than about 0.4 mm, not greater than about 0.3 mm, or not greater than about 0.2 mm.

Item 34. The abrasive article of one or more of these items, characterized in that the CSF have a single fiber bundle pull out shear strength at an interface between the abrasive portion and the CSF of at least about 5 Mpa, at least about 10 Mpa, at least about 15 Mpa.

Item 35. The abrasive article of one or more of these items, characterized in that the CSF have a single fiber bundle pull out rupture stress at an interface between the abrasive portion and the CSF of at least about 40 N, at least about 50 N, at least about 60 N.

Item 36. The abrasive article of one or more of these items, characterized in that the CSF have a critical embedded length Lc of at least about 2 mm, at least about 3 mm, at least about 4 mm.

Item 37. The abrasive article of one or more of these items, characterized in that the abrasive portion comprises a volume percentage of the CSF of at least about 1 vol %, at least about 2 vol %, at least about 3 vol %, at least about 4 vol %, at least about 5 vol %, at least about 6 vol %, at least about 9 vol %, and not greater than about 25 vol %, not greater than about 20 vol %, not greater than about 15 vol %.

Item 38. The abrasive article of one or more of these items, characterized in that the abrasive article comprises about 25 vol % to about 50 vol % of the organic bond material; about 40 vol % to about 70 vol % of the abrasive particles; or about 6 vol % to about 12 vol % of the CSF.

Item 39. The abrasive article of one or more of these items, characterized in that the abrasive article has a burst speed in excess of a burst speed of a conventional abrasive article having at least one continuous fiber reinforcement, and wherein the burst speed of the abrasive article is at least about 1% greater than that of the conventional abrasive article, at least about 5% greater, or at least about 10% greater.

Item 40. The abrasive article of one or more of these items, characterized in that the CSF have an aspect ratio of axial length to radial width of at least about 12, at least about 25, at least about 50, at least about 75, at least about 100, at least about 250, at least about 500, and not greater than about 1500, not greater than about 1000, not greater than about 750, not greater than about 500, not greater than about 250, not greater than about 200, not greater than about 150.

Item 41. The abrasive article of one or more of these items, wherein the discontinuous fibers are oriented in configuration comprising at least one of axial, parallel, circumferential and randomly distributed.

Item 42. The abrasive article of one or more of these items, wherein the discontinuous fibers are oriented in a configuration comprising a circumferential distribution, and the abrasive article has a burst speed of up to about 30% greater than that for a conventional abrasive article having a continuous fiber reinforcement web.

Item 43. The abrasive article of one or more of these items, wherein the discontinuous fibers are formed in a discrete layer in the abrasive body, and the discontinuous fibers can comprise a discrete layer area that is at least 75% of an area of the abrasive body, at least 80%, at least 85%, at least 90%, or even at least 95%.

Item 44. The abrasive article of one or more of these items, wherein the discontinuous fibers are not located at one or more of an innermost diameter and an outermost diameter of the area of the abrasive body.

As used herein, terms such as "reinforced" or "reinforcement" may refer to discontinuous components of a reinforcing material that is different from the bond and abrasive materials employed to make the bonded abrasive tool. Terms such as "internal reinforcement" or "internally reinforced" indicate that these components are within or embedded in the body of the tool. Background details related to reinforcement techniques and materials are described, for example, in U.S. Pat. No. 3,838,543, which is incorporated herein by reference in its entirety. Reinforced wheels also are described in U.S. Pat. Nos. 6,749,496, and 6,942,561, both of which are incorporated herein by reference in their entirety.

An exemplary binder system may include one or more organic resins, such as phenolic resin, boron-modified resin, nano-particle-modified resin, urea-formaldehyde resin, acrylic resin, epoxy resin, polybenzoxazine, polyester resin, isocyanurate resin, melamine-formaldehyde resin, polyimide resin, other suitable thermosetting or thermoplastic resins, or any combination thereof.

Specific, non-limiting examples of resins that can be used include the following: the resins sold by Dynea Oy, Finland, under the trade name Prefere and available under the catalog/product numbers 8522G, 8528G, 8680G, and 8723G; the resins sold by Hexion Specialty Chemicals, OH, under the trade name Rutaphen® and available under the catalog/product numbers 9507P, 8686SP, and SP223; and the resins sold by Sumitomo, formerly Durez Corporation, TX, under the following catalog/product numbers: 29344, 29346, and 29722. In an example, the bond material comprises a dry resin material.

An exemplary phenolic resin includes resole and novolac. Resole phenolic resins can be alkaline catalyzed and have a ratio of formaldehyde to phenol of greater than or equal to one, such as from 1:1 to 3:1. Novolac phenolic resins can be acid catalyzed and have a ratio of formaldehyde to phenol of less than one, such as 0.5:1 to 0.8:1.

An epoxy resin can include an aromatic epoxy or an aliphatic epoxy. Aromatic epoxies components include one or more epoxy groups and one or more aromatic rings. An example aromatic epoxy includes epoxy derived from a polyphenol, e.g., from bisphenols, such as bisphenol A (4,4'-isopropylidenediphenol), bisphenol F (bis[4-hydroxyphenyl]methane), bisphenol S (4,4'-sulfonyldiphenol), 4,4'-cyclohexylidenebisphenol, 4,4'-biphenol, 4,4'-(9-fluorenylidene)diphenol, or any combination thereof. The bisphenol can be alkoxylated (e.g., ethoxylated or propoxylated) or halogenated (e.g., brominated). Examples of bisphenol epoxies include bisphenol diglycidyl ethers, such as diglycidyl ether of Bisphenol A or Bisphenol F. A further example of an aromatic epoxy includes triphenylolmethane triglycidyl ether, 1,1,1-tris(p-hydroxyphenyl)ethane triglycidyl ether, or an aromatic epoxy derived from a monophenol, e.g., from resorcinol (for example, resorcin diglycidyl ether) or hydroquinone (for example, hydroquinone diglycidyl ether). Another example is nonylphenyl glycidyl ether. In addition, an example of an aromatic epoxy includes epoxy novolac, for example, phenol epoxy novolac and cresol epoxy novolac. Aliphatic epoxy components have one or more epoxy groups and are free of aromatic rings. The external phase can include one or more aliphatic epoxies. An example of an aliphatic epoxy includes glycidyl ether of C2-C30 alkyl; 1,2 epoxy of C3-C30 alkyl; mono or multiglycidyl ether of an aliphatic alcohol or polyol such as 1,4-butanediol, neopentyl glycol, cyclohexane dimethanol, dibromo neopentyl glycol, trimethylol propane, polytetramethylene oxide, polyethylene oxide, polypropylene oxide, glycerol, and alkoxylated aliphatic alcohols; or polyols. In one embodiment, the aliphatic epoxy includes one or more cycloaliphatic ring structures. For example, the aliphatic epoxy can have one or more cyclohexene oxide structures, for example, two cyclohexene oxide structures.

An example of an aliphatic epoxy comprising a ring structure includes hydrogenated bisphenol A diglycidyl ether, hydrogenated bisphenol F diglycidyl ether, hydrogenated bisphenol S diglycidyl ether, bis(4-hydroxycyclohexyl)methane diglycidyl ether, 2,2-bis(4-hydroxycyclohexyl)propane diglycidyl ether, 3,4-epoxycyclohexylmethyl-3,4-epoxycyclohexanecarboxylate, 3,4-epoxy-6-methylcyclohexylmethyl-3,4-epoxy-6-methylcyclohexanecarboxylate, di(3,4-epoxycyclohexylmethyl) hexanedioate, di(3,4-epoxy-6-methylcyclohexylmethyl) hexanedioate, ethylenebis(3,4-epoxycyclohexanecarboxylate), ethanedioldi(3,4-epoxycyclohexylmethyl)ether, or 2-(3,4-epoxycyclohexyl-5,5-spiro-3,4-epoxy)cyclohexane-1,3-dioxane.

An exemplary multifunctional acrylic can include trimethylolpropane triacrylate, glycerol triacrylate, pentaerythritol triacrylate, methacrylate, dipentaerythritol pentaacrylate, sorbitol triacrylate, sorbital hexacrylate, or any combination thereof. In another example, an acrylic polymer can be formed from a monomer having an alkyl group having from 1-4 carbon atoms, a glycidyl group or a hydroxyalkyl group having from 1-4 carbon atoms. Representative acrylic polymers include polymethyl methacrylate, polyethyl methacrylate, polybutyl methacrylate, polyglycidyl methacrylate, polyhydroxyethyl methacrylate, polymethyl acrylate, polyethyl acrylate, polybutyl acrylate, polyglycidyl acrylate, polyhydroxyethyl acrylate and mixtures thereof.

Depending upon the catalyzing agents and type of polymer, the binder system can be thermally curable or can be curable through actinic radiation, such as UV radiation, to form the binder system. The binder system can also include catalysts and initiators. For example, a cationic initiator can catalyze reactions between cationic polymerizable constituents. A radical initiator can activate free-radical polymerization of radically polymerizable constituents. The initiator can be activated by thermal energy or actinic radiation. For example, an initiator can include a cationic photoinitiator that catalyzes cationic polymerization reactions when exposed to actinic radiation. In another example, the initiator can include a radical photoinitiator that initiates free-radical polymerization reactions when exposed to actinic radiation. Actinic radiation includes particulate or non-particulate radiation and is intended to include electron beam radiation and electromagnetic radiation. In a particular embodiment, electromagnetic radiation includes radiation having at least one wavelength in the range of about 100 nm to about 700 nm and, in particular, wavelengths in the ultraviolet range of the electromagnetic spectrum.

The binder system can also include other components such as solvents, plasticizers, crosslinkers, chain transfer agents, stabilizers, dispersants, curing agents, reaction mediators and agents for influencing the fluidity of the dispersion. For example, the binder system can also include one or more chain transfer agents selected from the group consisting of polyol, polyamine, linear or branched polyglycol ether, polyester and polylactone.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. An abrasive article, comprising:
   a body comprising an abrasive portion comprising an organic bond material and abrasive particles dispersed in the organic bond material, wherein the abrasive portion comprises at least two abrasive layers; and
   a discrete layer of chopped strand fibers (CSF) located and extending radially between the at least two abrasive layers, wherein at least a portion of the chopped strand fibers (CSF) are in direct contact with each other.

2. The abrasive article of claim 1, wherein the abrasive portion has an outer diameter OD not greater than about 300 mm.

3. The abrasive article of claim 1, wherein the abrasive portion has an axial thickness AT not greater than about 10 mm.

4. The abrasive article of claim 1, wherein the discrete layer comprises a plurality of discrete layers that are axially separated from each other by portions of the abrasive portion.

5. The abrasive article of claim 1, wherein the abrasive article does not have a continuous fiber reinforcement web, such that the abrasive body is reinforced only by the CSF.

6. The abrasive article of claim 1, characterized by at least one continuous fiber reinforcement web in the abrasive body, such that the abrasive article is reinforced by the CSF and the continuous fiber reinforcement web.

7. The abrasive article of claim 1, wherein the CSF comprise phenolic resin-coated fiberglass CSF.

8. The abrasive article of claim 1, wherein the CSF comprise a rectangular cross-sectional shape having a sectional aspect ratio of width to thickness in a range of about 1.25:1 to about 3:1.

9. The abrasive article of claim 1, wherein the CSF comprise an axial length of at least about 6 mm, and not greater than about 150 mm.

10. The abrasive article of claim 1, wherein the CSF comprise a radial width of at least about 0.1 mm, and not greater than about 0.5 mm.

11. The abrasive article of claim 1, wherein the CSF have a single fiber bundle pull out shear strength at an interface between the abrasive portion and the CSF of at least about 5 MPa.

12. The abrasive article of claim 1, wherein the CSF have a single fiber bundle pull out rupture stress at an interface between the abrasive portion and the CSF of at least about 40 N.

13. The abrasive article of claim 1, wherein the CSF have a critical embedded length Lc of at least about 2 mm.

14. The abrasive article of claim 1, wherein the abrasive portion comprises a volume percentage of the CSF of at least about 1 vol %, and not greater than about 25 vol %.

15. The abrasive article of claim 1, wherein the abrasive article comprises about 25 vol % to about 50 vol % of the organic bond material; about 40 vol % to about 70 vol % of the abrasive particles; and about 6 vol % to about 12 vol % of the CSF.

16. The abrasive article of claim 1, wherein the CSF have an aspect ratio of axial length to radial width of at least about 12, and not greater than about 1500.

17. The abrasive article of claim 1, wherein the chopped strand fibers (CSF) are oriented in a configuration comprising at least one of axial, parallel, circumferential and randomly distributed.

18. The abrasive article of claim 1, wherein at least a portion of the chopped strand fibers (CSF) overlap each other.

19. The abrasive article of claim 1, wherein the chopped strand fibers (CSF) have an random orientation with respect to an axis of the body.

20. The abrasive article of claim 1, wherein the chopped strand fibers (CSF) comprises a glass material, wherein the portion of CSF that are in direct contact with each other comprise glass surfaces in direct contact with each other.

\* \* \* \* \*